P. G. SALOM.
POSITIVE PLATE FOR STORAGE BATTERIES AND PROCESS FOR THE MANUFACTURE THEREOF.
APPLICATION FILED JULY 27, 1909.
991,897.
Patented May 9, 1911.
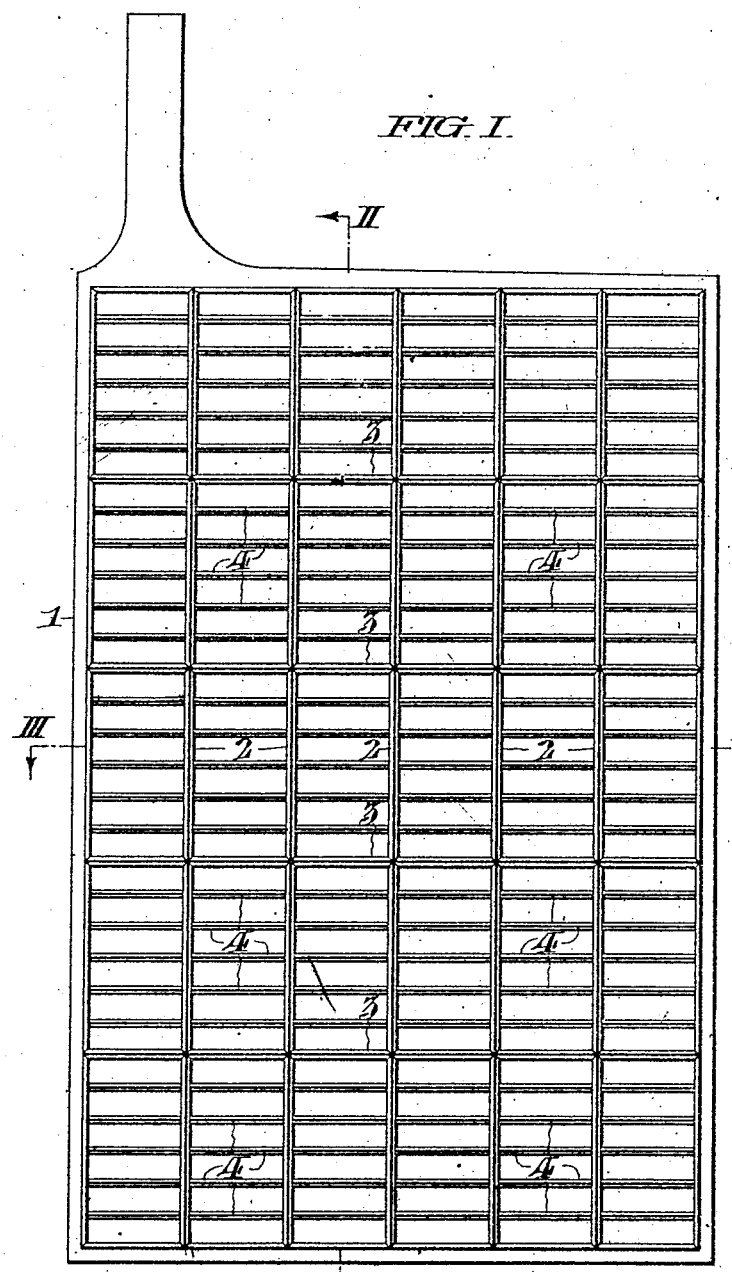
FIG. I.
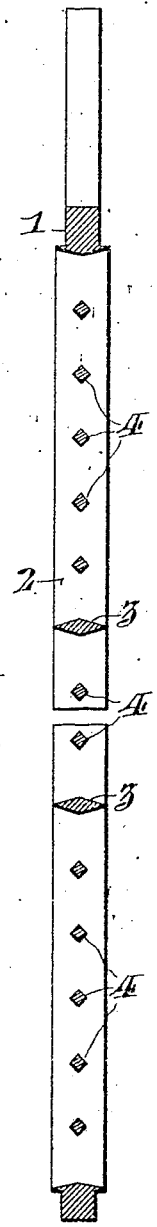
FIG. II.
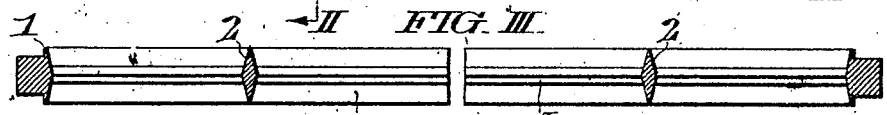
FIG. III.
WITNESSES:
John C. Bergner
James H. Bell
INVENTOR:
Pedro G. Salom,
By Alex D. Paul.
Attorneys.

UNITED STATES PATENT OFFICE.

PEDRO G. SALOM, OF PHILADELPHIA, PENNSYLVANIA, ASSIGNOR, BY MESNE ASSIGNMENTS, TO COMMONWEALTH TITLE INSURANCE AND TRUST COMPANY, TRUSTEE, OF PHILADELPHIA, PENNSYLVANIA, A CORPORATION OF PENNSYLVANIA.

POSITIVE PLATE FOR STORAGE BATTERIES AND PROCESS FOR THE MANUFACTURE THEREOF.

991,897.

Specification of Letters Patent. Patented May 9, 1911.

Application filed July 27, 1909. Serial No. 509,856.

*To all whom it may concern:*

Be it known that I, PEDRO G. SALOM, of Philadelphia, in the county of Philadelphia and State of Pennsylvania, have invented certain new and useful Improvements in Positive Plates for Storage Batteries and Processes for the Manufacture Thereof, whereof the following is a specification, reference being had to the accompanying drawings.

In said drawings, I have shown a preferred form of conducting support adapted for use in connection with my invention, which support constitutes the subject of an application filed contemporaneously herewith, being Serial No. 509,857 but it will of course be understood that my invention is not in any way limited to the use thereof.

As at present commercially conducted, and apart from theoretical or practically abandoned methods, the manufacture of the positive plates of lead storage batteries is essentially conducted by mechanically applying red lead, in the form of a paste or cement, to a supporting conductor, and then electrolytically converting the red lead into lead peroxid, *in situ*, that is to say, although the initial material from which the active material of the plate is ultimately to be made is applied mechanically to the conducting support, the conversion or, as it is technically termed, the "forming" into active material is effected after such application.

The object of the present invention is to permit the production of the ultimate active material in bulk, and its application to the support in what may be properly termed its final condition. Such application is effected without any intervention of electrolytic action at that stage of the process.

Referring to the drawings, I will now describe the conducting support, or grid which I find peculiarly well adapted to use in connection with my improved process.

In said drawings, Figure I, represents a side elevation of the grid; Fig. II, is a broken vertical section thereof on an enlarged scale, taken on the line II, II, of Fig. I; Fig. III, is a broken horizontal section, also on an enlarged scale, on the line III, III, in Fig. I.

Said grid consists of an open rectangular frame 1, provided with main bars 2, extending at intervals from top to bottom, and similar main bars 3, extending at intervals horizontally from side to side, with intermediate secondary bars 4, sub-dividing horizontally the rectangular compartments formed by the main bars. The whole structure is preferably cast integrally from antimonial lead. I have found that a grid of this form is peculiarly adapted for the application of the active material by hydraulic pressure, which is effected at one stage of my process.

In the practice of my present invention, I proceed as follows:—I first obtain a mass of lead peroxid in bulk, preferably by the following process: An electrolytic cell of lead is packed with a layer of spongy lead in close electrical and mechanical contact with the bottom of the interior portion. An electrolyte, preferably of sulfuric acid and water, is employed and lead cathodes are suspended in the electrolyte a short distance above the mass. When an electric current passes, the lead vessel and the spongy lead maintained therein constitute the anode, and the disengagement of oxygen takes place directly upon the sponge itself, with the result of wholly converting the mass of spongy lead into lead peroxid. The peroxid obtained as the result of this process, or otherwise produced, is properly dried and ground, so as to be in the form of a mass of definite particles with intervening voids. These particles are then mixed with a binding material, the latter being in relatively small proportions and having such physical characteristics as to permit the composite mass to undergo a high degree of compression. Furthermore, the chemical character of the binder should be such that it, or its derivatives under treatment, may be retained within the plate, without detriment to the structural strength or electrical characteristics of the latter, as distinguished from a binder of foreign material, which must either be removed, or if retained, disadvantageously modifies the plate. I prefer to use ground litharge as the binding material, preferably in a proportion between ten and twenty per cent. of the total mass. When litharge is employed as the binder, I disseminate it thoroughly by admixture with the peroxid particles, and moisten the whole mass with sulfuric acid and water, the quantity of acid in the solution preferably being from about ten to twenty per cent. by weight thereof. The moistening ingredient, such as dilute sulfuric acid, is employed in very limited quantities, so as not to form a pasty, or semi-liquid body, but merely a dampened mass of definite particles having about the temper of molding sand, the litharge being preferably only partly converted by the action of the acid, and its particles being disseminated with as much uniformity as possible through the peroxid particles. The mass of material thus obtained has the characteristic of lending itself to the application of heavy hydraulic pressure, without the disrupting tendency which would be manifested if the quantity of liquid were relatively large, and at the same time affording the necessary cohesion to the mass for the application thereof to the grid. When litharge is thus used, I believe that the physical condition above referred to corresponds with the presence of about ten per cent. (in weight) of the liquid ingredient to the total mass of peroxid and binder. The mass of dampened particles is then applied to the grid and compressed thereon by means of a heavy hydraulic pressure, such compressing action being rendered possible by reason of the physical condition above mentioned, as distinguished from that of a substantially coalescent semi-liquid or pasty body. When the plate is removed from the press, the active material will be found to be in a coherent condition, but in order to insure its permanency, I prefer to treat it after compression as follows:—The plate is dipped in water and afterward treated with a mixture of sulfuric acid and water, the quantity of the acid in the solution preferably not exceeding ten per cent. thereof. This treatment substantially converts the remaining litharge into sulfate, and thoroughly binds the mass of peroxid together, without, however, depriving it of the required porosity.

I have found that the plates embodying my invention are not only highly homogeneous and electrically efficient elements, but that they carry a relatively greater quantity of active material than can be applied to a given support by the processes actually in use.

When the plate is formed by the electrolytic conversion of red lead into peroxid, in situ, the reaction is attended by expansion of the applied material, and it has a tendency to loosen itself and become detached from the support. By my invention the peroxid is initially "formed" in the condition in which it is to be used, and since it does not undergo any expansion in the act of originally producing the plate, it has no tendency to become detached therefrom, at that stage of its existence. Furthermore, the process which forms part of my invention possesses valuable features of economy, since the electrolytic conversion of lead into spongy lead, and the conversion of the latter into lead peroxid, in bulk cost much less than the equivalent amount of red lead (which is the ordinary source of active material) at the respective prices prevailing for these ingredients.

In the foregoing specification I have described litharge as the preferable binding material, and have set forth that feature of the process which is addressed to its proper application and treatment. I do not, however, limit myself to the use of litharge as a binder, the desideratum of the binder being that it shall not, when initially applied, produce such a semi-liquid or pasty condition, as to interfere with the proper application of hydraulic pressure to the plate as a whole, by reason of the practical noncompressibility of any material which is substantially in a liquid or homogeneous pasty condition. It is also important that the chemical character of the binder shall be such that it or its derivatives under treatment may remain in the plate without impairing the latter.

Having thus described my invention, I wish to point out that the essential difference between the plate thus manufactured and those of the prior art, resides in the fact that in my invention the active material is initially "formed" externally to the plate itself, as distinguished from being electrolytically "formed" by the oxidation of the support itself (as in the original Planté plate), and as distinguished from being "formed", in situ, by the electrolytic oxidation of a material mechanically applied to the grid (as in the Brush-Faure plate), this latter method being that now commonly employed in the arts. I employ the term "externally formed" to conveniently describe this essential characteristic of the active material in my plate, meaning thereby that it is initially obtained, as such, in bulk, and does not undergo any change due to electrolysis in the original production of the plate.

I claim:

1. An initially "formed" positive plate for a storage battery; consisting of a conducting support having a homogeneous mass coherently compressed thereon, said mass consisting substantially of externally "formed" active material obtained in the condition of definite particles and having solid particles of binding material intimately disseminated throughout the mass.

2. An initially "formed" positive plate for a storage battery, consisting of a conducting support having a mass of active material coherently compressed thereon, said mass consisting substantially of externally "formed" peroxid of lead obtained in the condition of definite particles, and having particles of sulfate of lead intimately disseminated throughout the same, whereby the particles of peroxid are homogeneously bound together.

3. The hereinbefore described process for the manufacture of initially "formed" positive plates for a storage battery, which consists in disseminating particles of a solid binding material throughout a preponderating mass of peroxid of lead, said peroxid being in the condition of definite particles, and compressing the resultant mass coherently upon a conducting support, substantially as set forth.

4. The hereinbefore described process for the manufacture of positive plates for a storage battery which consists in initially "forming" a mass of peroxid of lead obtained in the condition of definite particles, adding litharge thereto in about the proportions specified, moistening the mass of mingled lead peroxid and litharge until said mass has about the temper of molding sand, and compressing the said mass upon a conducting support, substantially as set forth.

5. The hereinbefore described process for the manufacture of positive plates for a storage battery which consists in initially "forming" a mass of peroxid of lead obtained in the condition of definite particles, adding litharge thereto in about the proportions specified, moistening the mass of mingled lead peroxid and litharge with dilute sulfuric acid until said mass has about the temper of molding sand, compressing the mass upon a conducting support; and treating the plate with dilute sulfuric acid to effect the conversion of any previously unconverted litharge into sulfate, substantially as set forth.

In testimony whereof, I have hereunto signed my name, at Philadelphia, Pennsylvania, this twenty-sixth day of July, 1909.

PEDRO G. SALOM.

Witnesses:
JAMES H. BELL,
E. L. FULLERTON.